United States Patent
Scheessele

(10) Patent No.: US 7,055,111 B2
(45) Date of Patent: May 30, 2006

(54) OPPORTUNISTIC DATA TRANSFER FROM A PERSONAL DIGITAL APPARATUS

(75) Inventor: Evan Scheessele, Corvallis, OR (US)

(73) Assignee: Hewlett-Packard Development Company L.P., Houston, TX (US)

( * ) Notice: Subject to any disclaimer, the term of this patent is extended or adjusted under 35 U.S.C. 154(b) by 931 days.

(21) Appl. No.: 10/027,595

(22) Filed: Oct. 24, 2001

(65) Prior Publication Data

US 2003/0093547 A1 May 15, 2003

(51) Int. Cl.
*G06F 3/00* (2006.01)
*G06F 15/16* (2006.01)

(52) U.S. Cl. ............. 715/864; 709/217; 455/3.01

(58) Field of Classification Search ........... 455/3.01, 455/500, 73, 91, 95; 709/217–219; 715/864, 715/853, 855
See application file for complete search history.

(56) References Cited

U.S. PATENT DOCUMENTS

| | | | | |
|---|---|---|---|---|
| 5,535,147 | A * | 7/1996 | Jacobs et al. | 708/111 |
| 5,570,297 | A * | 10/1996 | Brzezinski et al. | 358/1.13 |
| 5,594,462 | A * | 1/1997 | Fishman et al. | 345/1.2 |
| 5,771,001 | A * | 6/1998 | Cobb | 340/573.1 |
| 5,815,127 | A * | 9/1998 | Jacobs et al. | 345/1.2 |
| 6,450,953 | B1 * | 9/2002 | Place et al. | 600/300 |
| 6,594,737 | B1 * | 7/2003 | Niwa et al. | 711/154 |
| 6,605,038 | B1 * | 8/2003 | Teller et al. | 600/300 |
| 6,790,178 | B1 * | 9/2004 | Mault et al. | 600/300 |

OTHER PUBLICATIONS

'Usage Models—The Automatic Synchronizer' printed from "The Official Bluetooth Website" at http://www.bluetooth.com/bluetoothguide/models/automatic.asp printed Jun. 11, 2001 pp1.
'Polar -Product Finder' from "Polar" website at http://www,polar.fi/productfinder/content.shtml printed Jun. 11, 2001 pp1.
'Polar S610' from "Polar" website at http://www.polar.fi/productfinder/serious/S610.shtml printed Jun. 11, 2001 pp1.
'Polar Accessories' from "Polar" website at http://www.polar.fi/productfinder/accessories.shtml printed Jun. 11, 2001 pp3-5.
'SportBrain Personal Fitness Assistant' from "SportBrain Inc." website at http://www.sportbrain.com/Home/Home.cfm printed Jun. 11, 2001 pp1.

(Continued)

*Primary Examiner*—Krisna Lim
(74) *Attorney, Agent, or Firm*—Hewlett-Packard Company

(57) ABSTRACT

The opportunistic data download method determines a preferred download time to download the accumulated data from a personal digital apparatus, such as a wristwatch-type device with sensors. The personal digital apparatus then polls for the download device at the download time. The personal digital apparatus may be Bluetooth-compliant and use the Bluetooth auto-discovery process as the polling operation. If the polling operation is unsuccessful at the download time, the polling operation is attempted at an updated download time. If the updated download time is a time during which the polling operation is successful, this time is used for downloading the accumulated data to the download device for all subsequent download operations.

14 Claims, 4 Drawing Sheets

OTHER PUBLICATIONS

'SportBrain: Products SportBrain First Step' from "SportBrain Inc." website at http://www.sportbrain.com/Products/FirstStep.cfm printed Jun. 11, 2001 pp2.

'SportBrain: Products: SportBrain Tracker' from "SportBrain Inc." website at http://www.sportbrain.com/Products/SportBrain.cfm printed Jun. 11, 2001 pp2.

'SportBrain: Products: SportBrain Transmitter' from "SportBrain Inc." website at http://www.sportbrain.com/Products/SportPort.cfm printed Jun. 11, 2001 pp2.

'Ericsson ChatPen Bluetooth Pen' from "Ericsson Bluetooth-based ChatPen" website at http://home.intekkom.com/cellular/technologies/bluetooth/ericsson_chatpen.htm printed Jun. 11, 2001 pp1-5.

'Pager Watch' from "Timex-Data Link" website at http://www.timex.com/html/data_link.html printed Jun. 11, 2001 pp2.

* cited by examiner

OPPORTUNISTIC DATA TRANSFER FROM A PERSONAL DIGITAL APPARATUS

FIELD OF THE INVENTION

The present invention relates generally to wireless data transfer. Particularly, the present invention relates to communication of data from a personal digital apparatus to a computer, printer, or other data storage device.

DESCRIPTION OF THE RELATED ART

The miniaturization of mobile electronic devices, such as personal digital assistants (PDA), has provided users with the ability to enter, organize, and display data while moving about. The data can then be transferred or downloaded to a personal computer when the user returns to his or her office.

The downloading of information from the mobile device to a personal computer or printer typically requires cables or infrared communication. For example, the user of a PDA may place the PDA into a cradle that is coupled to the computer with a cable through the computer's universal serial bus, serial bus, or parallel bus. The PDA may also be coupled to the computer through the infrared ports on both the PDA and the computer.

Once the PDA is coupled to the computer, the user may have to initiate the download process by depressing a key on the computer or touching the screen of the PDA. The data can then be downloaded from the PDA's memory to the computer. Data may also be uploaded from the computer to the PDA in the same manner.

One of the problems with this process for linking the mobile device with the computer is that either a physical link must be established between the mobile device and the computer or the infrared ports of each must be pointed relatively close to each other. This places a burden on the user to connect cables to all devices or be near enough to the infrared port of the computer to transfer the data.

An additional problem is that some sort of user intervention is required to initiate the transfer of data. The user must therefore remember to perform the data transfer when it is required or the data may be lost. There is a resulting need for a system and method for transferring data between a personal digital apparatus and a processing device or printer without user intervention and without a physical or infrared link.

SUMMARY OF THE INVENTION

The present invention encompasses a method and apparatus for opportunistic downloading of accumulated data from a personal digital apparatus to a download device. A download time to download the accumulated data is determined. The personal digital apparatus polls for the download device at the download time. If the polling operation is unsuccessful at the download time, the polling operation is attempted at an updated download time. If the polling operation at the updated download time is successful, subsequent polling operations are performed at the updated download time. If the updated download time is a time during which the polling operation is successful, this time is used for downloading the accumulated data to the download device.

DETAILED DESCRIPTION OF A PREFERRED EMBODIMENT

The present invention provides a user with the ability to setup a wireless link between a personal digital apparatus and a printer, computer, or storage unit. The device determines the best time to download the data in an opportunistic way by leaning from past download events, past download attempts, and user interaction.

Figure 1:
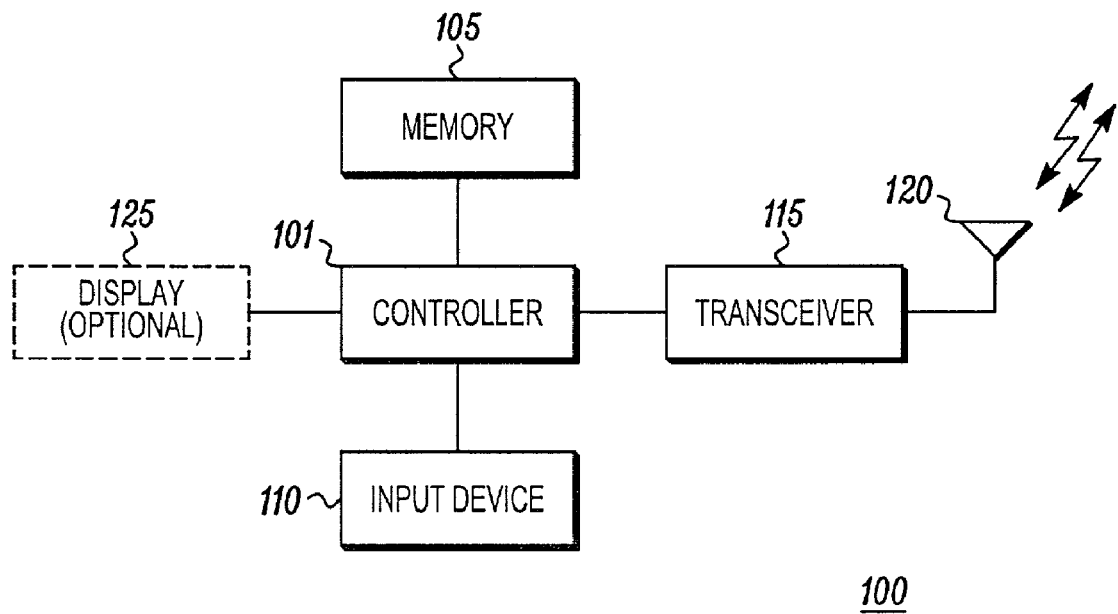
FIG. 1 shows a block diagram of one embodiment of a personal digital apparatus of the present invention.

FIG. 1 illustrates a block diagram of one embodiment of the personal digital apparatus (100) of the present invention. The personal digital apparatus (100) can take the form of any mobile electronic device such as a watch comprising sensors, a personal digital assistant, or any other type of device that can accumulate data for download.

In the preferred embodiment, the personal digital apparatus (100) is comprised of a controller (101) that controls the operation of the personal digital apparatus. The controller (101) may be a microprocessor, a microcontroller, or any other type of controlling circuit. The controller (101) is responsible for running the opportunistic data downloading processes of the present invention that are discussed subsequently.

Memory (105) is used store data accumulated by the personal digital apparatus. The memory (105) may take the form of random access memory (RAM), flash memory, non-volatile random access memory (NOVRAM), or microdrives. In the preferred embodiment, the memory retains any stored data when power is removed.

The personal digital apparatus (100) gathers data through an input device (110). In the preferred embodiment, the input device (110) is a sensor for reading data such as a pulse rate, a blood pressure, a blood-sugar level, or the oxygenation of a user's blood. In alternate embodiments, the input device (110) may be a camera, a microphone, or any other type of data gathering device.

The personal digital apparatus (100) may be comprised of a display (125). The display (125) can be used to display such things as time of day, date, and the information being gathered by the input device (110). This display (125) may be a liquid crystal display, a light emitting diode display, or any other type of display having the capability of displaying data. Alternate embodiments of the personal digital apparatus (100) do not require such a display (125).

The personal digital apparatus (100) is further comprised of a low-power transceiver (115). The transceiver (115) is capable of transmitting and receiving data at radio frequencies (RF) over the antenna (120). The transceiver (115) is responsible for modulating digital data to be transmitted and demodulating received RF data from the antenna (120). The present invention is not limited to any one air-interface scheme. These air interface schemes include, but are not limited to, amplitude modulation, frequency division multiple access, code division multiple access, Gaussian frequency shift keying (GFSK), and time division multiple access.

In the preferred embodiment, the transceiver (115) is Bluetooth compliant. The Bluetooth specification, the particulars of which can be readily obtained from the Internet web site www.bluetooth.com, calls for the use of low power (approximately 1 milliwatt) wireless transceivers operating at 2.45 GHz and using GFSK modulation. This power level provides a maximum range of approximately 10 meters. Each electronic device in the Bluetooth standard receives a unique 48-bit address in order to differentiate the devices. Data transmission is typically in the range of 500 kbps to 2 Mbps, depending on the application. Unlike infrared data transfer, a Bluetooth compliant transceiver is able to operate through walls and briefcases. Infrared data transfer is line of sight only.

Figure 2:
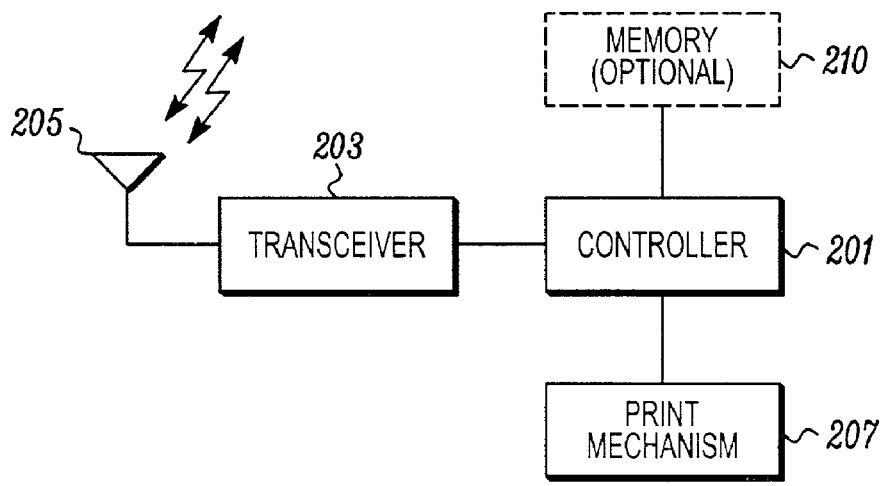
FIG. 2 shows a block diagram of a printer of the present invention.

FIG. 2 illustrates a block diagram of a printer of the present invention. The printer may be of any printing technology. For example, the printer may be an inkjet (e.g., Hewlett Packard DeskJet 940c) or a laser printer (e.g., Hewlett Packard LaserJet 1200N). Alternate embodiments use other printing technologies.

In the preferred embodiment, the printer is Bluetooth-compliant and, therefore, is comprised of a low power transceiver (203) that transmits and receives through an antenna (205). Similar to the personal digital apparatus, alternate embodiments of the printer may use other forms of low-power transmission than Bluetooth.

A controller (201) controls the operation of the printer. The controller (201) takes the demodulated data from the transceiver (203) and formats it for printing by the printing mechanism (207). The controller (201) is also responsible for running the processes of the present invention.

The printer may further be comprised of memory (210) that stores received data or data to be transmitted. The memory (210) may act as a buffer for received data that is being received faster than it can be printed.

In the preferred embodiment, the personal digital apparatus of the present invention is in the form of a Bluetooth-compliant wristwatch-type device that has medical data accumulation capabilities. The wristwatch interfaces with the Bluetooth-compliant printer in order to download and print the accumulated medical data.

As described above, the wristwatch has sensors for collecting medical data from the user wearing it and storing the data in memory. As described subsequently in reference to the processes of the present invention, the data is downloaded at opportunistic times by learning the best time to perform the download operation.

Figure 3:
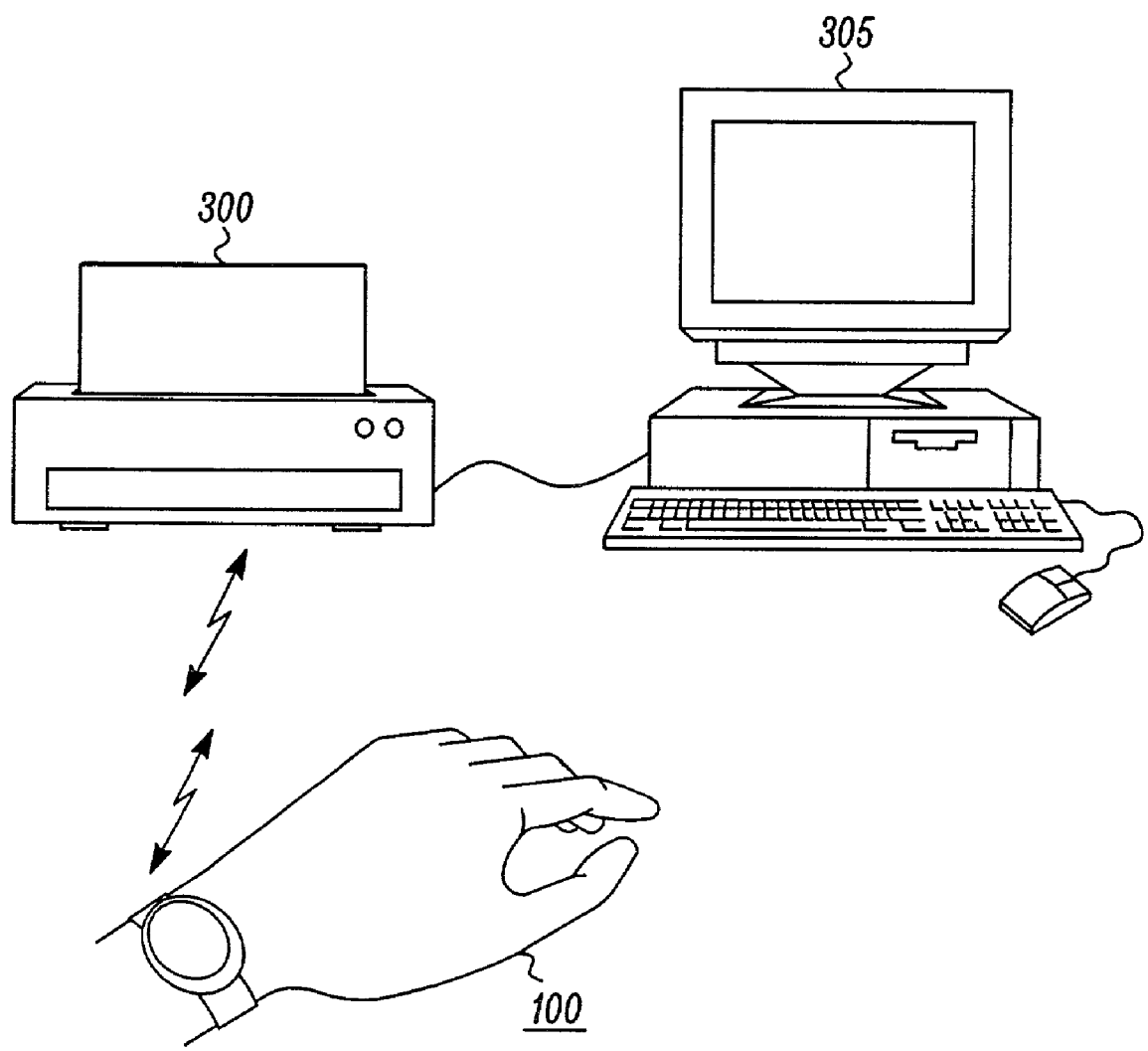
FIG. 3 shows a block diagram of a wireless system of the present invention.

FIG. 3 illustrates a diagram of such an opportunistic data download system. This system is comprised of the Bluetooth-compliant wristwatch-type device (100), the Bluetooth-compliant printer (300), and a personal computer (305). The printer (300) may be coupled to the personal computer (305) through any one of many ways that are well known in the art. For example, the printer (300) may be coupled to the personal computer (305) through a universal serial port or a parallel port.

In one embodiment of the system of FIG. 3, the printer (300) can communicate with the wristwatch (100) in a stand-alone fashion. The wristwatch (100) downloads its stored data to the printer for printing as described subsequently in FIGS. 4 and 5.

In another embodiment, the personal computer (305) is comprised of a Bluetooth-compliant transceiver that can communicate with the wristwatch (100). The wristwatch (100) can then download its stored data to the personal computer (305) for subsequent use by the personal computer (305).

The personal computer (305) may archive the data on a storage media such as a hard drive, floppy drive, CD-R, CD-RW, DVD-R, Flash, or any other type of storage media for future use. The personal computer (305) may also print the data to the coupled printer (300) if the printer is not Bluetooth-compliant or is busy processing a different print job.

The personal computer (305), in another embodiment, automatically transmits the downloaded data to a predetermined Internet web site. In this case the personal computer (305) is coupled to the Internet through a dial-up modem or direct connection. After the data has been downloaded, the personal computer (305) transmits the data to the required network server using a previously programmed URL. The server may belong to the user's doctor thus allowing the doctor to track the user's medical status using the downloaded data that is now stored on the network server.

And still another embodiment, the personal computer (305) uses the downloaded data to generate reports, charts, and graphs. For example, the personal computer (305) may generate a graph depicting the user's blood pressure over a predetermined period.

The system depicted in FIG. 3 accomplishes the above-described tasks without user intervention. These tasks rely on the opportunistic downloading of the accumulated data according to the processes of the present invention.

Figure 4:
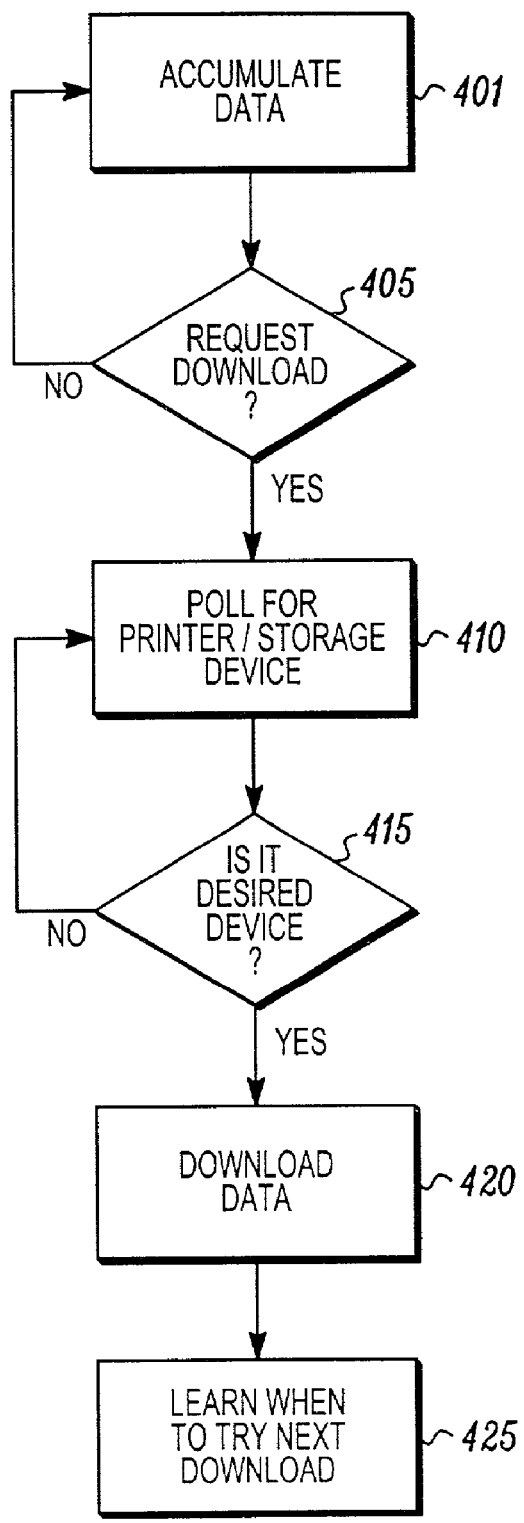
FIG. 4 shows a flowchart of a data downloading process of the present invention.

FIG. 4 illustrates a flowchart of the accumulation and opportunistic downloading process of the present invention. The process begins with the accumulation of data (step 401). The process next determines if a download is to be attempted (step 405).

The process of the present invention is opportunistic in that it learns the best times to attempt to download the accumulated data. For example, the process knows that it is not likely that the user will be within download range at 4:00 AM. The personal digital apparatus, therefore, will conserve power by not attempting to download at times that it learns that the user will not be within range. If the personal digital apparatus goes many days without a successful download attempt, the process tries different times of the day to locate a printer or other download device.

In one embodiment, after a predetermined number of failed attempts to download, the personal digital apparatus alerts the user to press a specific button when near a designated download device. The personal digital apparatus then learns when the next most likely time to poll for the download device. In another embodiment, the personal digital apparatus simply queries the user in order to determine what to do with the accumulated data.

Referring again to FIG. 4, if it is determined that a download request is not to be performed (step 405) the process returns to accumulating data (step 401). If the memory is full, the process waits for the next opportunity to download the accumulated data.

If it is determined that a download request is to be performed (step 405), the personal digital apparatus performs a polling operation in order to find the desired printer or other download device (step 410). This polling process is an auto-discovery process that is well known in the Bluetooth art and is not discussed further.

The process next checks to see if the discovered printer or other download device is the desired device (step 415). The personal digital apparatus may be assigned to look for only a specific printer such as the user's home printer. The personal digital apparatus may also look for any printer.

If the desired download device is not found (step 415), the personal digital apparatus continues polling for the desired device (step 410). If the desired device is found (step 415), the data is downloaded (step 420). In the preferred embodiment, the data download process is Bluetooth-compliant. In other embodiments, the data download process follows another data transfer specification or format.

From the experienced gained in the previous download attempt, the process learns when to attempt the next download session (step 425). The time for the next download attempt is then stored for future reference.

Figure 5:
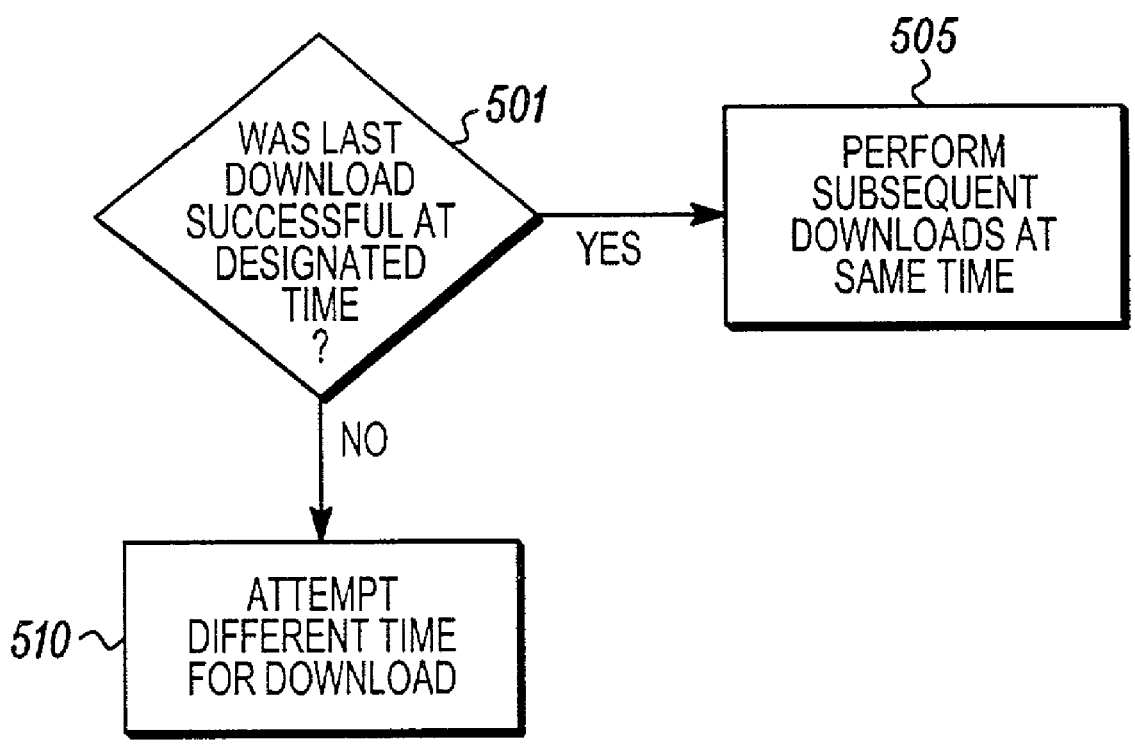
FIG. 5 shows a flowchart of a learning process of the present invention for downloading data.

FIG. 5 illustrates a flowchart of one embodiment of the learning process of the present invention. If the last download attempt was successful at the designated time (step 501), the subsequent downloads are performed at the same time (step 505). In the last download attempt was unsuccessful (step 501), a download is attempted at a different time (step 510).

While the above-described preferred embodiment is for a wristwatch-type device that collects medical data, other embodiments encompass other types of personal digital apparatuses. For example, the wristwatch or other personal digital apparatus may be comprised of programmable sensors. The personal digital apparatus can then be programmed through a personal computer or other computing device via a direct connection with the cable, a cradle, or an IR link. The apparatus can then capture only the data that the user desires to have recorded. This gives the user the ability to not only use the personal digital apparatus to record medical data but the user can also record fitness data for an exercise regimen. Alternate embodiments can record any other type of data depending on the type of sensors and programming in the apparatus.

In yet another embodiment, the printer is web-enabled such that it can communicate directly with a network such as the Internet. If during the previous download session the user's medical condition is determined to be worse than expected (e.g., blood pressure too high), the printer could fetch and print a document from the network that is related to the medical condition. Additionally, the printer could print out instructions from the user's doctor regarding steps to take to alleviate the condition or to print out a prescription for medicine to address the problem.

The previous embodiment could also work with the printer coupled to a personal computer that is, in turn, coupled to the network. In this case, the personal computer may have a stored database of documents relevant to the accumulated, downloaded data that can be printed.

The above-described embodiments are comprised of transceivers in both the personal digital apparatus and the download device. However, one or both of these devices may be comprised of only a transmitter and/or only a receiver. For example, the present invention will operate properly with only a transmitter in the personal digital apparatus and only a receiver in the download device.

In the preferred embodiment, the processes of the present invention are run by the controller of the personal digital apparatus. In alternate embodiments, the download devices such as the printer are responsible running at least a portion of the processes. For example, the printer may poll for the wristwatch-type device at the predetermined time. Once the wristwatch is within range of the polling, it downloads its accumulated data to the printer. If the wristwatch is not within range during the predetermined time, the printer goes through the learning process of FIG. 5 to determine an updated download time.

In such an embodiment, the wristwatch is responsible only for accumulating and transmitting the data. The printer is responsible for polling for the wristwatch and learning new times to perform the polling and downloading.

In summary, the personal digital apparatus of the present invention uses an opportunistic download process to transfer accumulated data to a printer or other storage device. The opportunistic download process learns to download the data at times that are more likely to result in successful downloads of the accumulated data. The process can also learn to download the data only to a specific device, such as the user's home printer that is Bluetooth-compliant.

What is claimed is:

1. A method for opportunistic downloading of accumulated data from a personal digital apparatus to a download device, the method comprising the steps of:

learning an opportunistic download time to attempt a download when a user is likely to be within a transmission range, wherein power is conserved by not attempting to download at learned times when the user will not be within range;

using the download time to download the accumulated data;

polling for the download device at the download time;

if the polling is unsuccessful at the download time, polling for the download device at an updated download time;

if the polling at the updated download time is successful, performing subsequent polling operations at the updated download time; and if the polling at the updated download time is successful, downloading the accumulated data to the download device.

2. The method of claim 1 and further including the step of determining if the successfully polled download device is a predetermined desired download device.

3. The method of claim 1 wherein the personal digital apparatus is a wristwatch-type device and the download device is a printer.

4. A method for opportunistic downloading of accumulated data from a wristwatch-type electronic apparatus to a printer, both the electronic apparatus and the printer having transceivers, the electronic apparatus configured to collect the accumulated data, the method comprising the steps of:

learning an opportunistic download time to attempt a download when a user is likely to be within a transmission range, wherein power is conserved by not attempting to download at learned times when the user will not be within range;

using the download time to download the accumulated data to the printer such that the download time is substantially equal to a time during which the electronic apparatus is within range of the printer;

polling for the printer at the download time;

if the polling is unsuccessful at the download time, polling for the printer at an updated download time;

if the polling at the updated download time is successful, performing subsequent polling operations at the updated download time; and if the polling at the updated download time is successful, downloading the accumulated data to the printer.

5. The method of claim 4 wherein the printer is is capable of performing the steps:

retrieving a document from the the computer in response to the accumulated data; and printing the document.

6. A method for opportunistic downloading of accumulated data from a wristwatch-type electronic apparatus to a computer, both the electronic apparatus and the computer having transceivers, the electronic apparatus configured to collect the accumulated data, the method comprising the steps of:

learning an opportunistic download time to attempt a download when a user is likely to be within a transmission range, wherein power is conserved by not attempting to download at learned times when the user will not be within range:

using the download time to download the accumulated data to the computer such that the download time is substantially equal to a time during which the electronic apparatus is within range of the computer;

polling for the computer at the download time;

if the polling is unsuccessful at the download time, polling for the computer at an updated download time;

if the polling at the updated download time is successful, performing subsequent polling operations at the updated download time; and if the polling at the updated download time is successful, downloading the accumulated data to the computer.

7. The method of claim 6 and further including the step of the computer generating graphics in response to the downloaded accumulated data.

8. The method of claim 6 and further including the step of the computer archiving the downloaded accumulated data on a drive.

9. A method for opportunistic downloading of accumulated data from a wristwatch-type electronic apparatus to a printer, the electronic apparatus comprising a transmitter and and configured to collect the accumulated data, the method comprising the steps of learning an opportunistic download time to attempt a download when a user is likely to be within a transmission range, wherein power is conserved by not attempting to download at learned times when the user will not be within range;

using the download time to download the accumulated data to the printer such that the download time is substantially equal to a time during which the electronic apparatus is within range of the printer;

polling for the printer at the download time;

if the polling is unsuccessful at the download time, polling for the printer at an updated download time;

if the polling at the updated download time is successful, performing subsequent polling operations at the updated download time; and if the polling at the updated download time is successful, downloading the accumulated data to the printer.

10. A method for opportunistic downloading of accumulated data from a personal digital apparatus to a download device, both the personal digital apparatus and the download device having transceivers, the personal digital apparatus configured to collect the accumulated data, the method comprising the steps of:

learning an opportunistic download time to attempt a download when a user is likely to be within a transmission range, wherein power is conserved by not attempting to download at learned times when the user will not be within range;

using the download time to download the accumulated data to the download device such that the download time is substantially equal to a time during which the personal digital apparatus is within range of the download device;

polling for the personal digital apparatus at the download time;

if the polling is unsuccessful at the download time, polling for the personal digital apparatus at an updated download time;

if the polling at the updated download time is successful, performing subsequent polling operations at the updated download time; and if the polling at the updated download time is successful, downloading the accumulated data to the printer.

11. A system for opportunistic downloading of accumulated data comprising: means for determining a download time to download the accumulated data;

means for learning an opportunistic download time to attempt a download when a user is likely to be within a transmission range, wherein power is conserved by not attempting to download at learned times when the user will not be within range;

means for polling for the download device at the download time;

means for determining an updated download time in response to an unsuccessful polling; and means for downloading the accumulated data to the download device.

12. A printer that receives opportunistic downloading of data from a personal digital apparatus configured to accumulate the data, the printer comprising:

a software module that communicates with a learning device that learns an opportunistic download time to attempt a download when a user is likely to be within a transmission range, wherein power is conserved by not attempting to download at learned times when the user will not be within range;

a transmitter that polls for the personal digital apparatus at a polling time; and a controller, coupled to the transmitter, that generates polling operation and the polling time, the controller comprising means for determining if the polling operation is unsuccessful at the polling time and generating an updated polling time in response to a predetermined number of polling operation failures.

13. A personal digital apparatus that performs opportunistic downloading of data to a download device, the personal digital apparatus comprising:

at least one connection between the personal digital apparatus and the download device for accumulating data on the personal digital apparatus;

a software module that communicates with a learning device that learns an opportunistic download time to attempt a download when a user is likely to be within a transmission range, wherein power is conserved by not attempting to download at learned times when the user will not be within range;

memory that stores the accumulated data;

a transmitter that transmits the accumulated data;

a controller coupled to the at least one connection, the memory, and the transmitter, the controller comprising means for generating a polling operation and the polling time, the controller comprising additional means for determining if the polling operation is unsuccessful at the polling time and generating an updated polling time in response to a predetermined number of polling operation failures.

14. The method of claim 1 and further including the step of retrieving and printing a document relevant to the accumulated data.

* * * * *

UNITED STATES PATENT AND TRADEMARK OFFICE
CERTIFICATE OF CORRECTION

PATENT NO.       : 7,055,111 B2                                        Page 1 of 1
APPLICATION NO.  : 10/027595
DATED            : May 30, 2006
INVENTOR(S)      : Evan Scheessele It is certified that error appears in the above-identified patent and that said Letters Patent is hereby corrected as shown below:

On the Title Pg, Item (73) in "Assignee", line 2, after "Company" insert -- , --.

In column 2, line 38, after "used" insert -- to --.

In column 6, line 61, in Claim 5, delete "is is" and insert -- is --, therefor.

In column 6, line 63, in Claim 5, delete "the the" and insert -- the --, therefor.

In column 7, line 9, in Claim 6, delete "range:" and insert -- range; --, therefor.

In column 7, line 31, in Claim 9, delete "and" before "configured".

In column 7, line 32, in Claim 9, after "of" insert -- : --.

Signed and Sealed this

Seventeenth Day of March, 2009

JOHN DOLL
*Acting Director of the United States Patent and Trademark Office*